United States Patent
McNair et al.

(10) Patent No.: US 10,785,138 B2
(45) Date of Patent: *Sep. 22, 2020

(54) METHODS AND APPARATUS TO PERFORM ELASTIC MONITORING OF SOFTWARE APPLICATIONS USING EMBEDDED WATCHDOGS

(71) Applicant: salesforce.com, inc., San Francisco, CA (US)

(72) Inventors: Christopher Patrick McNair, San Francisco, CA (US); Tuhin Kanti Sharma, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/190,837

(22) Filed: Nov. 14, 2018

(65) Prior Publication Data
US 2019/0081880 A1    Mar. 14, 2019

Related U.S. Application Data

(63) Continuation of application No. 15/249,984, filed on Aug. 29, 2016, now Pat. No. 10,164,859.

(51) Int. Cl.
*H04L 12/26* (2006.01)
*H04L 29/08* (2006.01)

(52) U.S. Cl.
CPC ............ *H04L 43/14* (2013.01); *H04L 43/08* (2013.01); *H04L 67/025* (2013.01); *H04L 67/10* (2013.01);
(Continued)

(58) Field of Classification Search
CPC .......... H04L 67/10; H04L 67/12; H04L 43/08
See application file for complete search history.

(56) References Cited

U.S. PATENT DOCUMENTS

| 8,645,529 B2 * | 2/2014 | Doddavula | H04L 67/34 709/223 |
| 9,558,441 B2 * | 1/2017 | Bachelor | G06N 3/02 |

(Continued)

*Primary Examiner* — Chirag R Patel
(74) *Attorney, Agent, or Firm* — LKGlobal | Lorenz & Kopf, LLP

(57) ABSTRACT

A method for implementing software application monitoring techniques is provided. The method embeds, by at least one processor, a monitor in an application to create a self-monitoring application package, wherein the monitor is configured to generate metrics data associated with functional health of the application; deploys the self-monitoring application package to a remote computing system, via a communication device communicatively coupled to the at least one processor; executes the self-monitoring application package, by the remote computing system; automatically receives, via the communication device, the metrics data from the remote computing system; migrates the self-monitoring application package to a second remote computing system, wherein the monitor is configured to generate the metrics data independent of a remote computing system location of the self-monitoring application package; executes the self-monitoring application package by the second remote computing system; and automatically receives the metrics data from the second remote computing system.

20 Claims, 6 Drawing Sheets

(52) U.S. Cl.
CPC .......... *H04L 67/1097* (2013.01); *H04L 67/22* (2013.01); *H04L 67/2833* (2013.01)

(56) References Cited

U.S. PATENT DOCUMENTS

| | | | |
|---|---|---|---|
| 10,164,859 B2 * | 12/2018 | McNair | H04L 67/10 |
| 2016/0254957 A1 * | 9/2016 | Maes | G06F 9/5072 |
| | | | 709/223 |

* cited by examiner

METHODS AND APPARATUS TO PERFORM ELASTIC MONITORING OF SOFTWARE APPLICATIONS USING EMBEDDED WATCHDOGS

CROSS-REFERENCE TO RELATED APPLICATION(S)

This application is a continuation of U.S. patent application Ser. No. 15/249,984, filed Aug. 29, 2016.

TECHNICAL FIELD

Embodiments of the subject matter described herein relate generally to monitoring software applications. More particularly, embodiments of the subject matter relate to elastic monitoring of software applications in a secure server environment.

BACKGROUND

A datacenter is a facility used to house computer systems and associated components, such as telecommunications and storage systems. It generally includes multiple power supplies, data communications connections, environmental controls (e.g., air conditioning, fire suppression) and various security devices, and may be part of a data storage network. Large datacenters may be industrial scale operations which use a large amount of electricity.

A datacenter may be used to store and execute any type of software application, and various levels of security and capacity may be used for a datacenter. Monitoring the health of these software applications deployed, executed, and running in a datacenter or other server environment is difficult when the security level of the datacenter is high. Additionally, in the event that a software application is transferred to a new server or datacenter environment, external health monitors must be reconfigured to accommodate the new location.

Accordingly, it is desirable to provide a mechanism for monitoring health of software applications in a secure datacenter environment, independent of hardware location of each software application. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for implementing software application monitoring techniques. The method embeds, by at least one processor, a monitor in an application to create a self-monitoring application package, wherein the monitor is configured to generate metrics data associated with functional health of the application; deploys the self-monitoring application package to a remote computing system, via a communication device communicatively coupled to the at least one processor; executes the self-monitoring application package, by the remote computing system; automatically receives, via the communication device, the metrics data from the remote computing system; migrates the self-monitoring application package to a second remote computing system, wherein the monitor is configured to generate the metrics data independent of a remote computing system location of the self-monitoring application package; executes the self-monitoring application package by the second remote computing system; and automatically receives, via the communication device, the metrics data from the second remote computing system.

Some embodiments provide a computer system for implementing software application monitoring techniques. The computer system includes a system memory element; a communication device, configured to transmit and receive data external to the computer system; and at least one processor communicatively coupled to the system memory element and the communication device, the at least one processor configured to: embed a monitor in an application to create a self-monitoring application package, wherein the monitor is configured to generate metrics data associated with functional health of the application; deploy, via the communication device, the self-monitoring application package to a remote computing system; initiate execution of the self-monitoring application package, by the remote computing system; automatically receive, via the communication device, the metrics data from the remote computing system, wherein the monitor is configured to generate the metrics data independent of a remote computing system location of the self-monitoring application package; migrate the self-monitoring application package to a second remote computing system; initiate execution of the self-monitoring application package, by the second remote computing system; and automatically receive, via the communication device, the metrics data from the second remote computing system.

Some embodiments provide a non-transitory, computer-readable medium containing instructions thereon, which, when executed by a processor, are capable of performing a method. The method creates self-monitoring software application packages, each of the self-monitoring application packages comprising a software application and a health monitor application; deploys the self-monitoring application packages to a first plurality of servers of a data storage network; automatically receives health data associated with the software application from the first plurality of servers, wherein the health data is generated by the health monitor application; recognizes additional computing resources added to the data storage network, the additional computing resources comprising a second plurality of servers; transfers the self-monitoring application packages to the second plurality of servers; and continuously and automatically receives the health data generated by the health monitor application from the second plurality of servers.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for performing health monitoring of deployed and executed software applications using an elastic system that is capable of continuous software application monitoring during scaling of the data storage network. More specifically, the subject matter relates to generating, deploying, and potentially migrating self-monitoring software application packages that include (i) a main software application, and (ii) "watchdog" monitoring software. The main software application and the watchdog software are executed in parallel and independently of the other. The watchdog software replaces conventional external software monitoring techniques, which must be reconfigured when the main application is transferred to a new server location. The watchdog software is configured to detect and transmit health status data for the software application continuously, including situations in which the main software application has failed and in which the self-monitoring software application package has been transferred to another server or other computing location.

Figure 1:
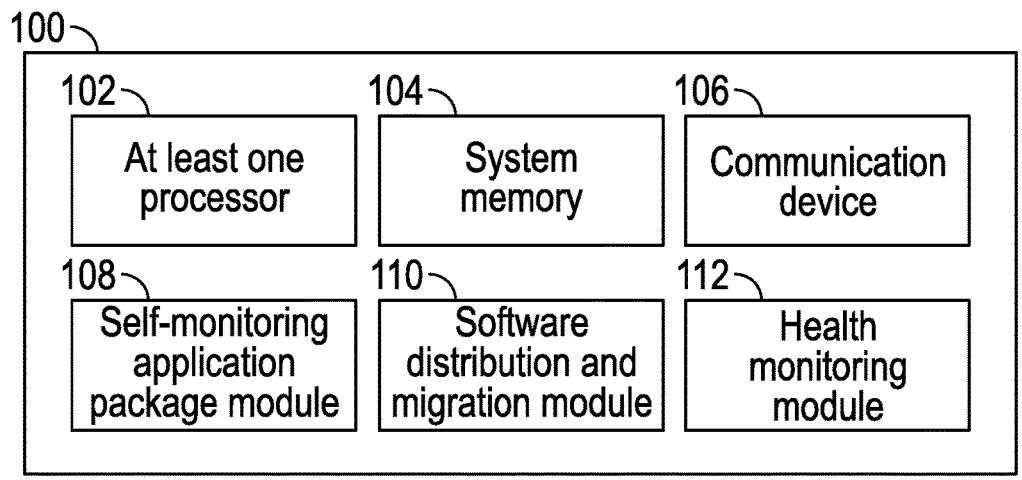
FIG. 1 is a functional block diagram of an elastic monitoring system, in accordance with the disclosed embodiments.

Turning now to the figures, FIG. 1 is a functional block diagram of an elastic monitoring system 100, in accordance with the disclosed embodiments. The elastic monitoring system 100 may be implemented using any suitable computing device in communication with one or more platforms used to store and execute a software application. The elastic monitoring system 100 generally includes, without limitation: at least one processor 102, system memory 104, a communication device 106, a self-monitoring application package module 108, a software distribution and migration module 110, and a health monitoring module 112. These elements and features of the elastic monitoring system 100 may be operatively associated with one another, coupled to one another, or otherwise configured to cooperate with one another as needed to support the desired functionality—in particular, the health monitoring of software applications, as described herein. For ease of illustration and clarity, the various physical, electrical, and logical couplings and interconnections for these elements and features are not depicted in FIG. 1. Moreover, it should be appreciated that embodiments of the elastic monitoring system 100 will include other elements, modules, and features that cooperate to support the desired functionality. For simplicity, FIG. 1 only depicts certain elements that relate to the health monitoring techniques described in more detail below.

The at least one processor 102 may be implemented using any suitable processing system, such as one or more processors (e.g., multiple chips or multiple cores on a single chip), controllers, microprocessors, microcontrollers, processing cores and/or other computing resources spread across any number of distributed or integrated systems, including any number of "cloud-based" or other virtual systems. Alternatively, the at least one processor 102 is not implemented using a microcontroller or processor; in this case, the elastic monitoring system 100 utilizes microcontroller and/or processor components relevant to a particular application.

The at least one processor 102 is configured to communicate with system memory 104. The system memory 104 represents any non-transitory short or long term storage or other computer-readable media capable of storing programming instructions for execution on the at least one processor 102, including any sort of random access memory (RAM), read only memory (ROM), flash memory, magnetic or optical mass storage, and/or the like. It should be noted that the system memory 104 represents one suitable implementation of such computer-readable media, and alternatively or additionally, the at least one processor 102 could receive and cooperate with external computer-readable media realized as a portable or mobile component or application platform, e.g., a portable hard drive, a USB flash drive, an optical disc, or the like.

The communication device 106 is suitably configured to transmit and receive data including, without limitation, self-monitoring software application packages and health status data associated with the "main" software applications in the self-monitoring software application packages. For purposes of transmitting and receiving data between the communication device 106 and one or more remote servers, the communication device 106 may use any applicable wired or wireless communication link. The communication device 106 may transmit and receive communications over a local area network (LAN), a wireless local area network (WLAN), the Internet, a satellite uplink/downlink, a cellular network, a broadband network, a wide area network, or any standard method of communication between computing systems.

The self-monitoring application package module 108 is configured to create self-monitoring application packages by embedding health monitoring "watchdog" software into a substantive software application. The software application is generally a "main", substantive software application that is executed to accomplish one or more computing tasks. The main software application may be any software application that is deployed and executed. Exemplary embodiments of the main software application are described below, with regard to FIGS. 2, 5, and 6.

The "watchdog" software may also be referred to as monitoring software, health status software, health monitoring software, or more simply, a watchdog. Each watchdog is specifically configured to detect a healthy status or an unhealthy status for a particular main software application, indicating whether the main software application is executing and performing appropriately. The standards for a healthy status or an unhealthy status are specific to each main software application, and may be different for each main software application. Therefore, the content of each watchdog, which is dedicated to health status verification of one particular main software application, may be different as well.

The software distribution and migration module 110 is configured to distribute and potentially migrate the created self-monitoring software application packages. The software distribution and migration module 110 initially distributes the self-monitoring software application packages, transmitting the application packages to an appropriate embedded system, computing device, or other computer hardware for execution. In some embodiments, the software distribution and migration module 110 is further configured to transfer or migrate the self-monitoring application packages to different computer hardware, for purposes of scaling applicable hardware or to use different hardware for storage and execution of the self-monitoring software application packages.

The health monitoring module 112 is configured to continuously receive, via the communication device 106, health status data transmitted by self-monitoring application packages. In certain embodiments, the health status data received by the health monitoring module 112 includes an indication of a healthy status or an unhealthy status of a substantive or "main" software application that is packaged with the watchdog monitoring software. The health monitoring module 112 may use the received health status data for purposes of health status visualization as it relates to execution of the software application, health status alerting to notify developers of anomalies or other concerns associated with execution of the software application, or the like.

In practice, the self-monitoring application package module 108, the software distribution and migration module 110, and/or the health monitoring module 112 may be implemented with (or cooperate with) the at least one processor 102 to perform at least some of the functions and operations described in more detail herein. In this regard, the self-monitoring application package module 108, the software distribution and migration module 110, and/or the health monitoring module 112 may be realized as suitably written processing logic, application program code, or the like.

Figure 2:
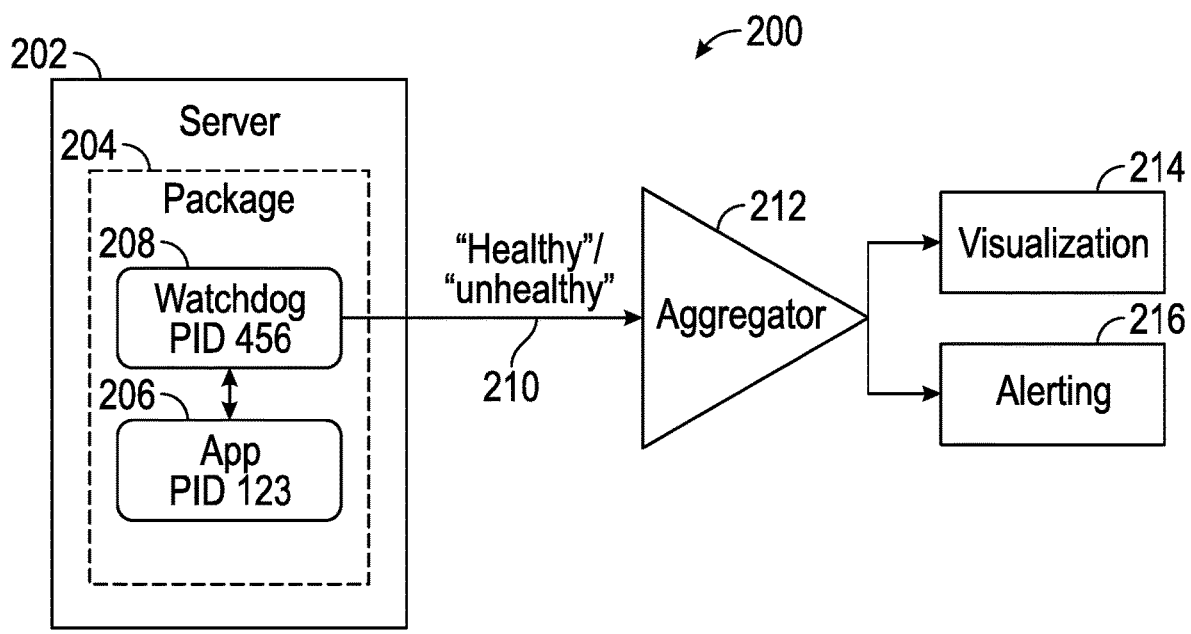
FIG. 2 is a diagram of an embodiment of a self-monitoring application package.

FIG. 2 is a diagram of an embodiment of a first implementation 200 of self-monitoring application package 204. As shown, the self-monitoring application package 204 is implemented on a server 202. In certain embodiments, the server 202 is implemented using a high level of security, and may be part of a secure datacenter environment. In the context of the present disclosure, a "datacenter" may be implemented as any group of servers with restricted direct access, e.g., a cluster or a datacenter. A secure datacenter includes secure servers (e.g., server 202), which store and execute substantive software applications. In other embodiments, the self-monitoring application package 204 may be implemented in other types of computing environments, including, without limitation, embedded systems, Internet of Things (IoT) applications, or the like. Examples of such embodiments are described below with regard to FIGS. 5-6.

The self-monitoring application package 204 includes at least: (i) a software application 206 and (ii) a watchdog 208. The software application 206 may be any software application comprising a list of processor-executable instructions that are executed to accomplish a substantive task. The watchdog 208 is a companion piece of software comprising a second list of processor-executable instructions that are developed and used for purposes of testing and/or analysis of the software application 206 to determine a health status of the software application 206. The health status of the software application 206 may include an indication of a healthy status or an unhealthy status. The healthy status indicates that the software application 206 is executing and performing normally, while the unhealthy status indicates that the software application 206 is not performing normally (e.g., there was an error during execution of the software application 206). The watchdog 208 generates a health status signal 210 to transmit the determined health status. In the embodiment shown, the health status signal 210 is transmitted to an aggregator 212 for further use in visualization applications 214 and/or alerting applications 216.

Figure 3A:
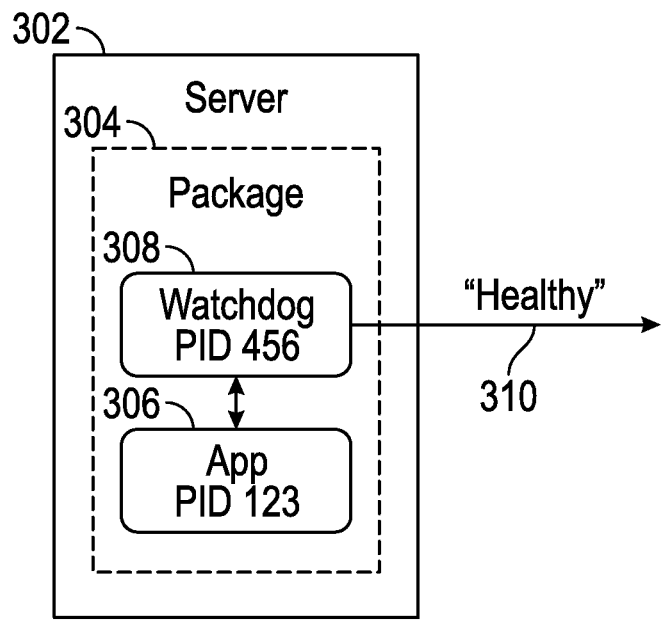
FIGS. 3A-3B are diagrams illustrating potential signal generation of a self-monitoring application package, in accordance with the disclosed embodiments.
Figure 3B:
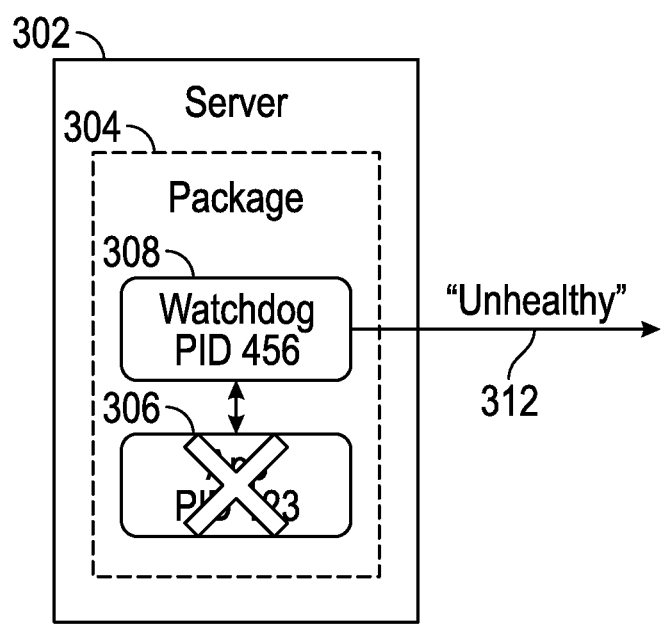

FIGS. 3A-3B are diagrams illustrating potential signal generation of a self-monitoring application package 304, in accordance with the disclosed embodiments. FIG. 3A illustrates an embodiment of the software application 306 and the watchdog 308 implemented on a server 302. The server 302 may include any number of application servers, and each server may be implemented using any suitable computer. In some embodiments, the server 302 includes one or more dedicated computers. In some embodiments, the server 302 includes one or more computers carrying out other functionality in addition to server operations. In the context of the present disclosure, a "datacenter" may be implemented as any group of servers with as restricted direct access, e.g., a cluster or a datacenter.

Generally, the software application 306 and the watchdog 308 are executed in parallel. Parallel execution permits the software application 306 to operate independently of the watchdog 308, and permits the watchdog 308 to operate independently of the software application 306. In this way, when the software application 306 encounters an error or fails during execution, the watchdog 308 is not affected and continues to execute normally. Similarly, when the watchdog 308 encounters an error or fails during execution, the software application 306 is not affected and continues to execute normally. As shown in FIG. 3, the software application 306 is identified by PID 123, while the watchdog 308 is identified by PID 456. The distinct PID numbers further emphasize the distinction between the two distinct sets of executable instructions which may be executed in parallel.

Although the software application 306 and the watchdog 308 are executed in parallel and operate independently, the watchdog 308 is in communication with the software application 306 for purposes of testing and analysis of the software application 306. The watchdog 308 operates to determine whether the software application 306 is executing as required, and generates a signal to indicate whether the software application 306 is "healthy" or "unhealthy". As shown, the software application 306 is operating normally, and as a result, the watchdog 308 generates a healthy signal 310, indicating acceptable operation of the software application 306.

FIG. 3B illustrates an embodiment of the software application 306 and the watchdog 308 implemented on the same server 302 and, similar to the embodiment of FIG. 3A, the software application 306 and the watchdog 308 are executed in parallel. However, in the embodiment of FIG. 3B, the software application 306 is not operating normally. This example may occur when the software application 306 fails, encounters an error, or if the software application 306 is too slow to respond to stimuli. For example, if the software application 306 is under a heavy load and cannot respond in a timely manner, an unhealthy signal may be generated. In this scenario, a watchdog 308 may produce an unhealthy signal if the software application 306 is running slower than a particular threshold time. In another scenario, a watchdog 308 may produce an unhealthy signal if the software application 306 is not running (i.e., executing) or has stopped running during a time when the software application 306 is expected to be running. In this particular example, because the software application 306 is not operating normally, the watchdog 308 generates an unhealthy signal 312.

Figure 4:
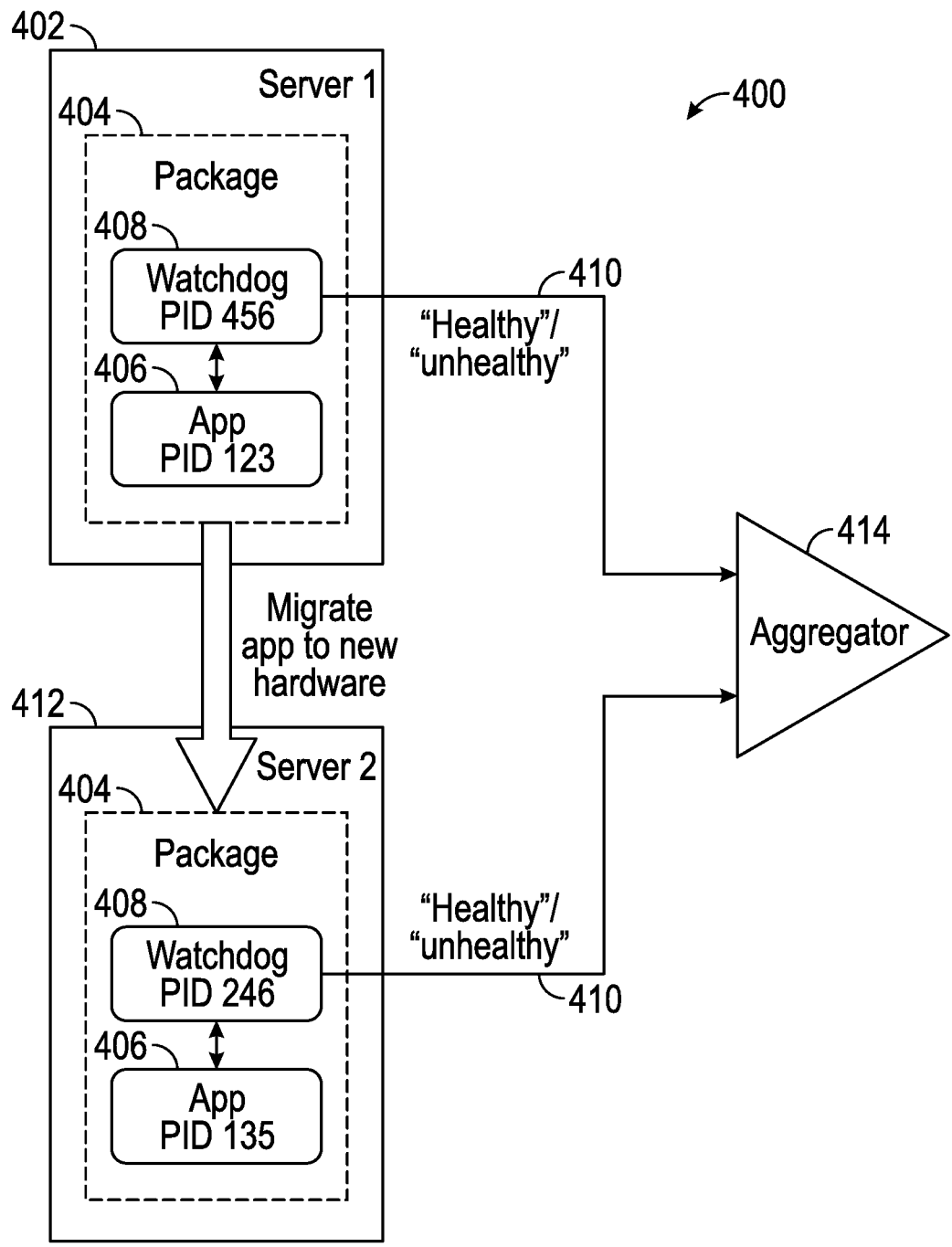
FIG. 4 is a diagram illustrating migration of a self-monitoring application package, in accordance with the disclosed embodiments.

FIG. 4 is a diagram illustrating migration 400 of a self-monitoring application package 404, in accordance with the disclosed embodiments. Like the embodiment shown in FIG. 3A, the self-monitoring application package 404 (which includes the software application 406 and the watchdog 408) is implemented on a first server 402. The first server 402 may be implemented as described previously with regard to FIGS. 2, 3A, and 3B.

In the embodiment shown, the self-monitoring application package 404 is transferred (i.e., migrates) to a second server 412. Such migration 400 may occur as a result of scaling a secure datacenter, in an effort to increase hardware capacity of the secure datacenter. In some embodiments, the self-monitoring application package 404 is transferred as an initial distribution, prior to implementation and initial execution of the self-monitoring application package 404.

Migration 400 of the self-monitoring application package 404 does not require additional configuration of the datacenter (or other implementation hardware in communication with the first server 402 and/or the second server 412) for health monitoring purposes. The self-monitoring application package 404 includes built-in health status monitoring, in the form of the embedded watchdog 408 application. As such, the self-monitoring application package 404 does not require commonly-used external software application 406 monitoring. As described previously with regard to FIGS. 3A-3B, the self-monitoring application package 404 generates a signal 410 to indicate the health status of the software application 406. In some embodiments, the health status signal 410 generated by the watchdog 408 may be transmitted to an aggregator 414. In certain embodiments, the aggregator 414 may be implemented as a system memory address to which the health status signal 410 is sent by the watchdog 408. A single data transmission from the watchdog 408 to the aggregator 414 may be used to limit the individual connections coming out of a datacenter for security and/or auditing purposes. Additionally, the aggregator 414 may be used to verify that the data being sent by the watchdog 408 (i.e., the health status signal 410) is well-formed and pertains to the expected protocol. The aggregator 414 may also be used to authenticate the source of the data. For example, in the case where a malicious piece of software imitates the watchdog 408 and sends an "unhealthy" health status signal 410 when the software application 406 is operating in a "healthy" manner. After collection by the aggregator 414, the health status signal 410 may be used for any desired purpose.

Figure 5:
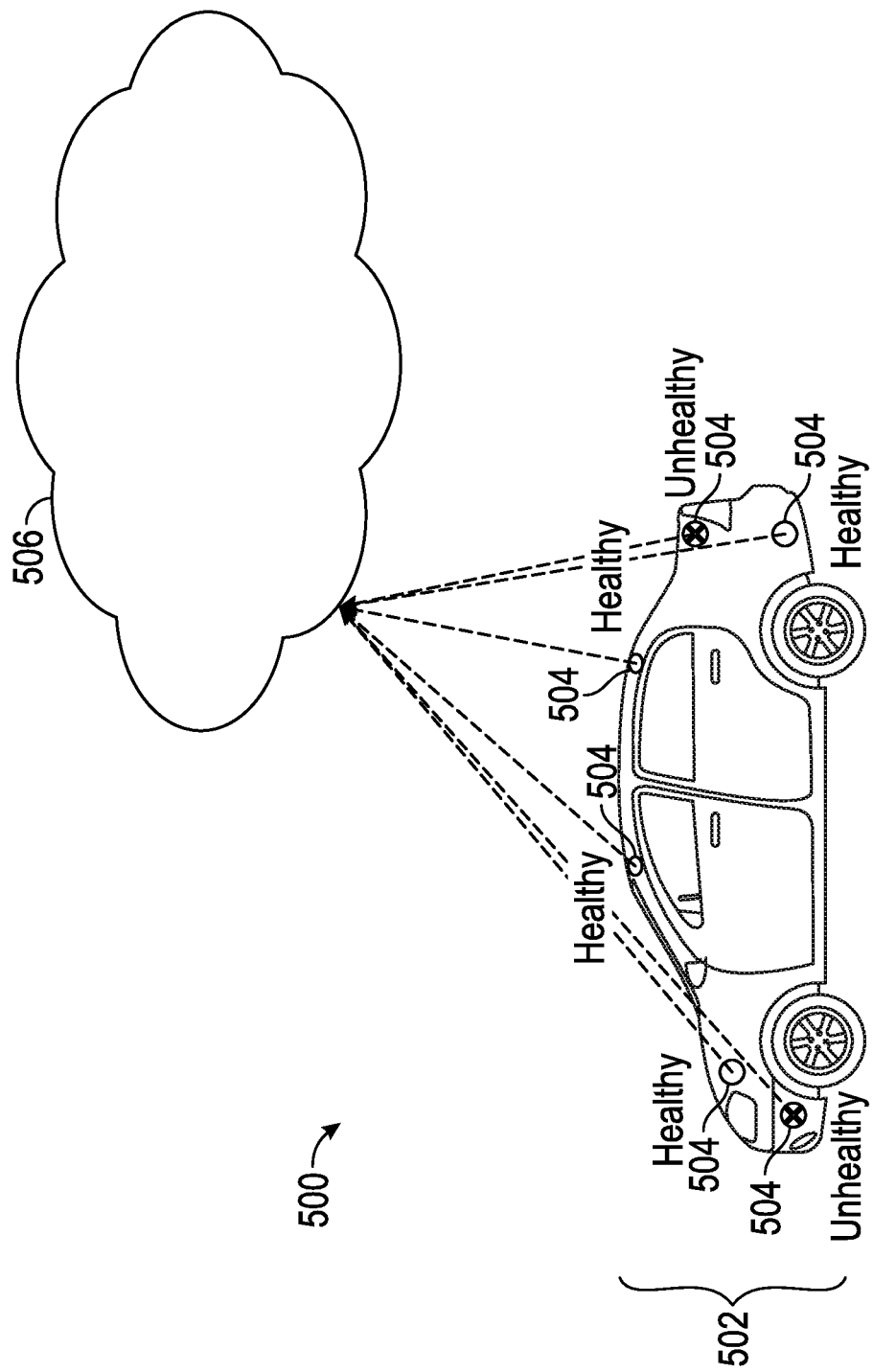
FIG. 5 is a diagram of a second embodiment of a self-monitoring application package.

FIG. 5 is a diagram of a second embodiment of a self-monitoring application package 504. In this particular embodiment, a plurality of self-monitoring application packages 504 are implemented onboard a vehicle 502, which may be implemented using a car, truck, motorcycle, watercraft, aircraft, spacecraft, hovercraft, or any other type of vehicle 502. The plurality of self-monitoring application packages 504 may be used onboard the vehicle 502 to perform any function and to provide health status information associated with the performed function. For example, in some embodiments, each sensor onboard the vehicle 502 could have an embedded watchdog (e.g., in a self-monitoring application package 504) that reports the health of the sensor to some central system. This may be important if sensors are used to slow down a car when it gets too close to another car as faulty/unhealthy sensors should be identified and fixed. In other embodiments, a status of different parts of the vehicle 502 may be shown on a central dashboard of the vehicle 502. For example, the vehicle 502 could have a display that presents the health of headlights and tail lights, tire pressure, and other parts of the car that the driver may care about.

As shown, the self-monitoring application packages 504 are executed, which includes parallel execution of the included software application and watchdog application (i.e., health status monitoring application). For each self-monitoring application package 504, the watchdog application monitors the operation of the software application and produces a health status monitor signal that indicates whether the operation of the software application is healthy or unhealthy.

The self-monitoring application packages 504 transmit these health status monitor signals to remote hardware (e.g., a remote server or other computing system) via a data communication network 506. The data communication network 506 may be any digital or other communications network capable of transmitting messages or data between devices, systems, or components. In certain embodiments, the data communication network 506 includes a packet switched network that facilitates packet-based data communication, addressing, and data routing. The packet switched network could be, for example, a wide area network, the Internet, or the like. In various embodiments, the data communication network 506 includes any number of public or private data connections, links or network connections supporting any number of communications protocols. The data communication network 506 may include the Internet, for example, or any other network based upon TCP/IP or other conventional protocols. In various embodiments, the data communication network 506 could also incorporate a wireless and/or wired telephone network, such as a cellular communications network for communicating with mobile phones, personal digital assistants, and/or the like. The data communication network 506 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Once transmitted, the health status monitor signals may be received by any desired recipient, and used in any desired application, which may include visualization, analysis, trending, alerting, and other applications associated with operation of the software application onboard the vehicle 502.

Figure 6:
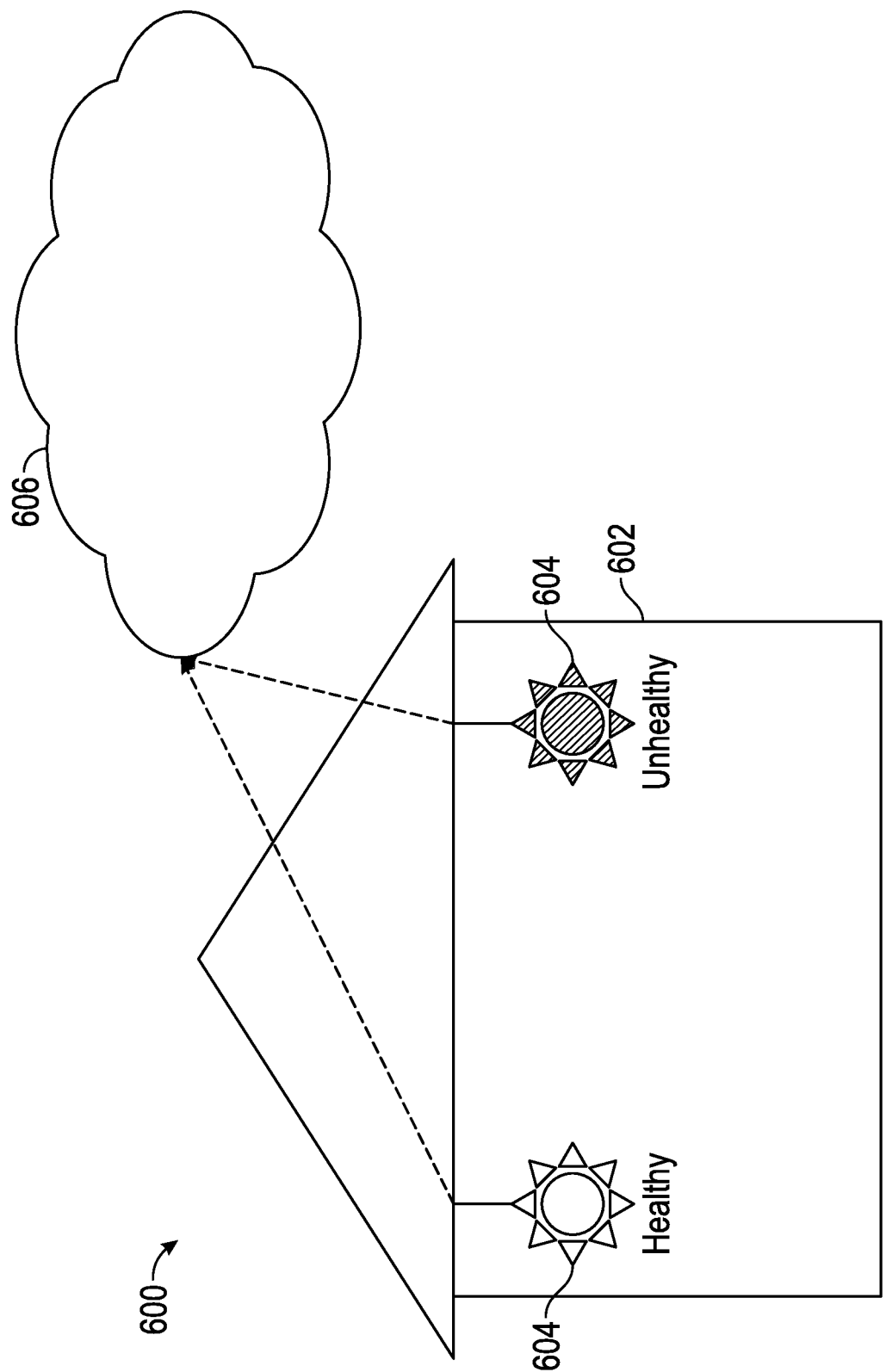
FIG. 6 is a diagram of a third embodiment of a self-monitoring application package.

FIG. 6 is a diagram of a third embodiment of a self-monitoring application package 604. In this particular embodiment, a plurality of self-monitoring application packages 604 are implemented as part of a "smart" home 602, which may be implemented as a house, an apartment, or any other type of residence that includes sensor-based functionality, embedded systems, or any other type of computing functionality associated with one or more software applications. The plurality of self-monitoring application packages 604 may be used inside or outside the smart home 602 to perform any function and to provide health status information associated with the performed function. Here, embedded watchdogs (of self-monitoring application packages 604) can be used to monitor different devices in a smart home 602. For example, a lightbulb used in conjunction with a self-monitoring application package 604 can emit a signal, via the watchdog of the self-monitoring application package 604, when the lightbulb is nearing the end of its life or when the filament is dead. As another example, an air conditioning unit used in conjunction with a self-monitoring application package 604 can emit a signal (via a watchdog of the self-monitoring application package 604) when the unit is too cold or is freezing over. In a third example, a garage door used in conjunction with a self-monitoring application package 604 can emit a signal (via a watchdog of the self-monitoring application package 604) when the motor is damaged.

As shown, the self-monitoring application packages 604 are executed, which includes parallel execution of the included software application and watchdog application (i.e., health status monitoring application). For each self-monitoring application package 604, the watchdog application monitors the operation of the software application and produces a health status monitor signal that indicates whether the operation of the software application is healthy or unhealthy. The self-monitoring application packages 604 transmit these health status monitor signals to remote hardware (e.g., a remote server or other computing system) via a data communication network 606. The data communication network 606 was described previously with regard to FIG. 5, and will not be redundantly described here.

Similar to the embodiment shown in FIG. 5, once the health status monitor signals are transmitted, the health status monitor signals may be used in any desired application, which may include visualization, analysis, trending, alerting, and other applications associated with operation of the software application as part of the smart home 602.

Figure 7:
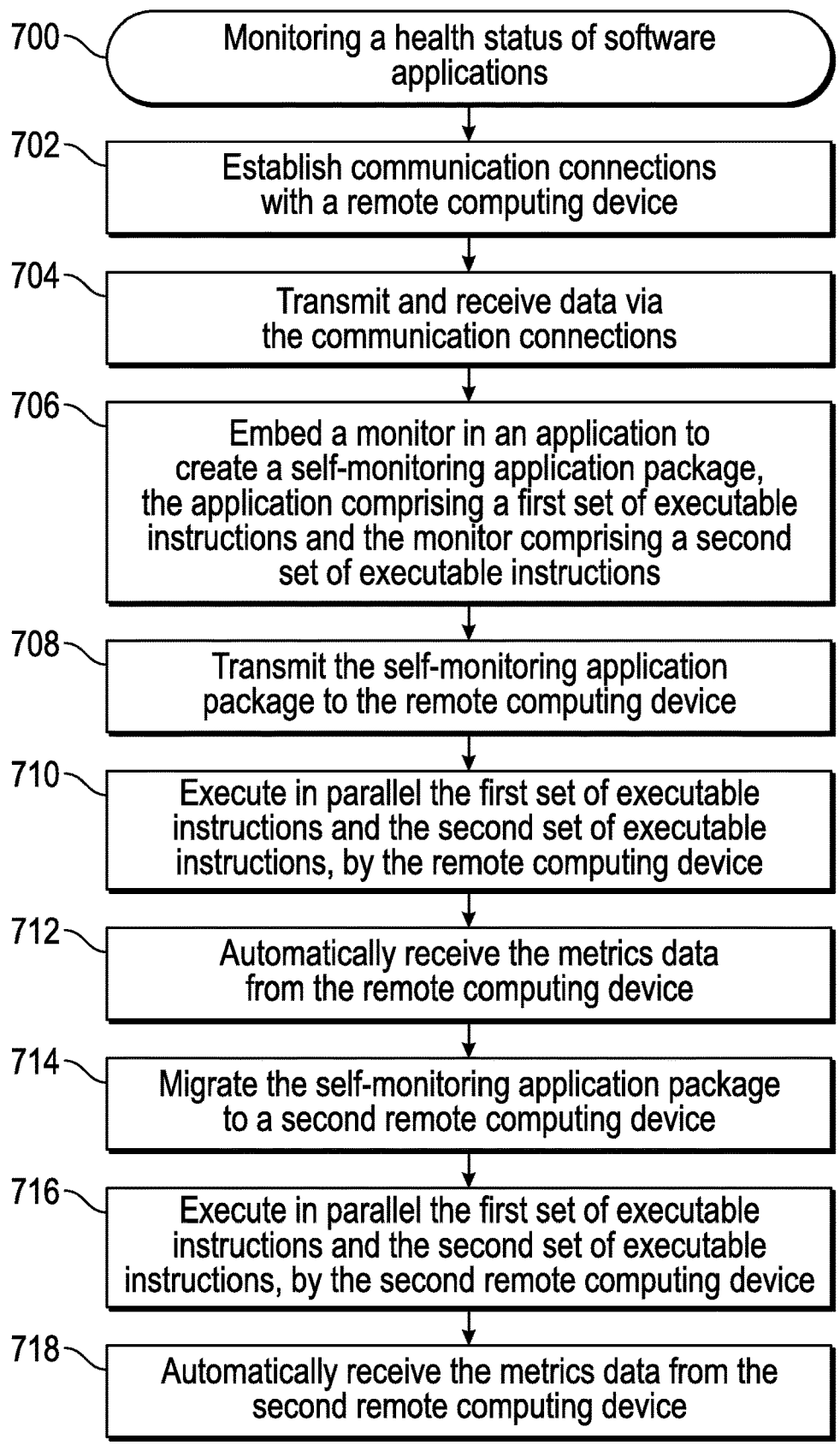
FIG. 7 is a flow chart that illustrates an embodiment of a process for monitoring a health status of software applications.

FIG. 7 is a flow chart that illustrates an embodiment of a process 700 for monitoring a health status of software applications. The process 700 may be implemented as part of any suitable embodiment using one or more self-monitoring application packages. The various tasks performed in connection with process 700 may be performed by software, hardware, firmware, or any combination thereof. For illustrative purposes, the following description of process 700 may refer to elements mentioned above in connection with FIGS. 1-6. In practice, portions of process 700 may be performed by different elements of the described system. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. Moreover, one or more of the tasks shown in FIG. 7 could be omitted from an embodiment of the process 700 as long as the intended overall functionality remains intact.

For ease of description and clarity, it is assumed that the process 700 begins by establishing communication connections with a remote computing device (step 702). The remote computing device may be implemented using any type of computer system with the capability of executing software applications. Exemplary embodiments of the remote computing device may include a secure server, such as that used in a datacenter environment, as described previously with regard to FIGS. 2-4; any embedded computing system; any implementation of an Internet-of-Things (IoT) system, which may include standalone computing devices and/or embedded computing systems, such as those described previously with regard to FIGS. 5-6. Here, the process 700 establishes communication connection to the remote computing device by connecting to a wired or wireless data communication network. The process 700 transmits and receives data via the communication connections (step 704).

The process 700 then embeds a monitor in an application to create a self-monitoring application package, the application comprising a first set of executable instructions and the monitor comprising a second set of executable instructions (step 706). The application is any software application that performs one or more functions when executed, and the monitor is companion software that tests and/or analyzes the application during execution of the application, for purposes of determining functional health of the application (i.e., determining whether the application is operating as expected). In this way, the monitor is a type of test code that the process 700 has packaged with the application to create the self-monitoring application package. Due to the internal health-monitoring characteristics, the self-monitoring application package does not require external health monitoring.

Next, the process 700 transmits the self-monitoring application package to the remote computing device (step 708), using the established communication connections. Once received, the self-monitoring application package may be used for at least two purposes: (1) to perform the functionality of the software application; and (2) to monitor the health and performance of the software application, during execution.

The process 700 then executes, in parallel, the first set of executable instructions and the second set of executable instructions, by the remote computing device (step 710). The process 700 has created the self-monitoring application package to include two separate and distinct sets of executable instructions that are associated with two separate and distinct software applications (e.g., the monitor and the application). Here, the process 700 executes the two parts separately and in parallel, such that execution of the monitor is not dependent upon "healthy" or normal execution of the application, and execution of the application is not dependent upon "healthy" or normal execution of the monitor.

After executing the first and second sets of executable instructions (step 710), the process 700 automatically receives the metrics data from the remote computing device (step 712). The metrics data is generated by the monitor during the parallel execution of the application and the monitor, and is thus automatically received due to the automatic generation and transmission of the metrics data by the remote computing device. In certain embodiments, the metrics data includes a binary signal that indicates a healthy status or an unhealthy status of the application during execution of the application. Criteria to determine whether the application is healthy or unhealthy is determined by developers that create the monitor software, and each monitor is created to evaluate a particular software application. In some embodiments, however, the metrics data includes the binary signal in combination with probable cause data that indicates a most likely cause of an unhealthy status of the application. In this embodiment, the application may have experienced a particular error or failure condition that may be specified by the metrics data, to facilitate alerting, repair, visualization, or other purposes.

The process 700 then migrates the self-monitoring application package to a second remote computing device (step 714). In this step, the process 700 transfers the self-monitoring application package from the remote computing device to a second remote computing device, for purposes of executing the application and monitor using a different hardware platform. Migration of the self-monitoring application package may be performed when additional hardware resources (e.g., the second remote computing device)

become available, or when the originally used hardware resources (e.g., the remote computing device) become unavailable for use.

Using software application health-monitoring techniques commonly known in the art, a software application would be monitored externally. For example, a software application may be implemented on a secure server, and health-monitoring software that resides on a different hardware platform would be configured to communicate with the secure server and to analyze and determine a health status of the software application during execution. Using this example, when the software application is migrated or transferred to a different secure server, the health-monitoring software would require reconfiguration to analyze and determine a health status of the software application when executed by the different secure server. However, the process 700 uses a self-monitoring application package, which includes the monitor as an internal software component of the application, which continues to maintain a distinction as a separate and distinct health status monitoring software application, and which may be executed in parallel to the application.

After migrating the self-monitoring application package to a second remote computing device (step 714), the process 700 executes, in parallel, the first set of executable instructions and the second set of executable instructions, by the second one of the plurality of secure servers (step 716). Here, the process 700 activates the self-monitoring application package such that the application and the monitor are executed in parallel. The process 700 then automatically receives the metrics data from the second remote computing device (step 718), due to the automatic generation of the metrics data once the application and the monitor are executed.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematics shown in FIGS. 2-4 depict exemplary arrangements of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for implementing software application monitoring techniques, the method comprising:
    embedding a monitor comprising a first set of executable instructions into an application comprising a second set of executable instructions, to create a self-monitoring application package, by at least one processor, wherein the first set of executable instructions and the second set of executable instructions comprise distinct software applications configured to execute in parallel, and wherein the monitor is configured to generate metrics data associated with functional health of the application during parallel execution of the first set of executable instructions and the second set of executable instructions;
    transmitting the self-monitoring application package to a remote computing system, via a communication device communicatively coupled to the at least one processor;
    receiving the metrics data automatically generated during the parallel execution of the first set of executable instructions and the second set of executable instructions by the remote computing system, via the communication device;
    migrating the self-monitoring application package to a second remote computing system, by the at least one processor, wherein the monitor is configured to generate the metrics data independent of a remote computing system location of the self-monitoring application package; and
    receiving the metrics data automatically generated during the parallel execution of the first set of executable instructions and the second set of executable instructions by the second remote computing system, via the communication device.

2. The method of claim 1, further comprising:
    establishing communication connections to a plurality of secure servers and a second plurality of secure servers, by the communication device, wherein the remote computing system comprises the plurality of secure servers, and wherein the second remote computing system comprises a second plurality of secure servers;
    transmitting the self-monitoring application package via the communication connections, by the at least one processor; and
    receiving the metrics data via the communication connections, by the at least one processor.

3. The method of claim 1, further comprising:
    establishing communication connections to a vehicle onboard computing system and a second vehicle onboard computing system, by the communication device, wherein the remote computing system comprises the vehicle onboard computing system, and wherein the second remote computing system comprises the second vehicle onboard computing system;
    transmitting the self-monitoring application package via the communication connections, by the at least one processor; and
    receiving the metrics data via the communication connections, by the at least one processor.

4. The method of claim 1, further comprising:
    establishing communication connections to a smart home residential computing system and a second smart home residential computing system, by the communication device, wherein the remote computing system comprises the smart home residential computing system, and wherein the second remote computing system comprises the second smart home residential computing system;
    transmitting the self-monitoring application package via the communication connections, by the at least one processor; and
    receiving the metrics data via the communication connections, by the at least one processor.

5. The method of claim 1, wherein the metrics data comprises a binary signal that indicates a healthy status or an unhealthy status of the application; and
    wherein the functional health of the application comprises the healthy status or the unhealthy status.

6. The method of claim 5, wherein, when the binary signal indicates an unhealthy status, the metrics data further comprises probable cause data that indicates a most likely cause of the unhealthy status.

7. The method of claim 1, further comprising:
    generating analysis and trending data associated with operation of the software application, based on the metrics data, by the at least one processor.

8. The method of claim 1, further comprising:
    providing alerts associated with operation of the software application, based on the metrics data, by the at least one processor.

9. A computer system for implementing software application monitoring techniques, the computer system comprising:
    a system memory element;
    a communication device, configured to transmit and receive data external to the computer system;
    at least one processor communicatively coupled to the system memory element and the communication device, the at least one processor configured to:
    embed a monitor comprising a first set of executable instructions into an application comprising a second set of executable instructions, to create a self-monitoring application package, wherein the first set of executable instructions and the second set of executable instructions comprise distinct software applications configured to execute in parallel, and wherein the monitor is configured to generate metrics data associated with functional health of the application during parallel execution of the first set of executable instructions and the second set of executable instructions;
    transmit the self-monitoring application package to a remote computing system, via the communication device;
    receive the metrics data automatically generated during the parallel execution of the first set of executable instructions and the second set of executable instructions by the remote computing system, via the communication device;
    migrate the self-monitoring application package to a second remote computing system, wherein the monitor is configured to generate the metrics data independent of a remote computing system location of the self-monitoring application package; and receive the metrics data automatically generated during the parallel execution of the first set of executable instructions and the second set of executable instructions by the second remote computing system, via the communication device.

10. The computer system of claim 9, wherein the communication device is further configured to:

establish communication connections to a plurality of secure servers and a second plurality of secure servers, wherein the remote computing system comprises the plurality of secure servers, and wherein the second remote computing system comprises a second plurality of secure servers; and wherein the at least one processor is further configured to:

transmit the self-monitoring application package via the communication connections; and receive the metrics data via the communication connections.

11. The computer system of claim 9, wherein the communication device is further configured to:

establish communication connections to a vehicle onboard computing system and a second vehicle onboard computing system, wherein the remote computing system comprises the vehicle onboard computing system, and wherein the second remote computing system comprises the second vehicle onboard computing system; and wherein the at least one processor is further configured to:

transmit the self-monitoring application package via the communication connections, by the at least one processor; and receive the metrics data via the communication connections.

12. The computer system of claim 9, wherein the communication device is further configured to:

establish communication connections to a smart home residential computing system and a second smart home residential computing system, wherein the remote computing system comprises the smart home residential computing system, and wherein the second remote computing system comprises the second smart home residential computing system; and wherein the at least one processor is further configured to:

transmit the self-monitoring application package via the communication connections; and receive the metrics data via the communication connections.

13. The computer system of claim 9, wherein the metrics data comprises a binary signal that indicates a healthy status or an unhealthy status of the application; and wherein the functional health of the application comprises the healthy status or the unhealthy status.

14. The computer system of claim 13, wherein, when the binary signal indicates an unhealthy status, the metrics data further comprises probable cause data that indicates a most likely cause of the unhealthy status.

15. The computer system of claim 9, wherein the at least one processor is further configured to:

generate analysis and trending data associated with operation of the software application, based on the metrics data; and provide alerts associated with operation of the software application, based on the metrics data.

16. A non-transitory, computer-readable medium containing instructions thereon, which, when executed by a processor, are capable of performing a method comprising:

creating self-monitoring software application packages, by the processor, each of the self-monitoring application packages comprising a health monitor application comprising a first set of executable instructions and a software application comprising a second set of executable instructions, wherein the first set of executable instructions and the second set of executable instructions comprise distinct software applications configured to execute in parallel;

deploying the self-monitoring application packages to a first plurality of servers of a data storage network, via a communication device communicatively coupled to the processor;

automatically receiving health data associated with the software application from the first plurality of servers, via the communication device, wherein the health data comprises metrics data generated by the health monitor application during parallel execution of the first set of executable instructions and the second set of executable instructions;

recognizing additional computing resources added to the data storage network, by the processor, the additional computing resources comprising a second plurality of servers;

transferring the self-monitoring application packages to the second plurality of servers, by the processor, wherein the health monitor application is configured to generate the metrics data independent of a location of the self-monitoring application packages; and continuously and automatically receiving the health data generated by the health monitor application during the parallel execution of the first set of executable instructions and the second set of executable instructions by the second plurality of servers, via the communication device.

17. The non-transitory, computer-readable medium of claim 16, wherein the metrics data comprises a binary signal that indicates a healthy status or an unhealthy status of the application; and wherein the functional health of the application comprises the healthy status or the unhealthy status.

18. The non-transitory, computer-readable medium of claim 17, wherein, when the binary signal indicates an unhealthy status, the metrics data further comprises probable cause data that indicates a most likely cause of the unhealthy status.

19. The non-transitory, computer-readable medium of claim 16, wherein the method further comprises: generating analysis and trending data associated with operation of the software application, based on the metrics data, by the processor.

20. The non-transitory, computer-readable medium of claim 16, wherein the method further comprises:

providing alerts associated with operation of the software application, based on the metrics data, by the processor.

* * * * *